(12) United States Patent
Haque et al.

(10) Patent No.: US 7,294,218 B2
(45) Date of Patent: *Nov. 13, 2007

(54) COMPOSITE MATERIAL WITH IMPROVED STRUCTURAL, ACOUSTIC AND THERMAL PROPERTIES

(75) Inventors: Enamul Haque, Novi, MI (US); Terry L. Cheney, Northville, MI (US); Arthur Blinkhorn, Fenton, MI (US)

(73) Assignee: Owens Corning Intellectual Capital, LLC DE (US)

( * ) Notice: Subject to any disclaimer, the term of this patent is extended or adjusted under 35 U.S.C. 154(b) by 467 days.

This patent is subject to a terminal disclaimer.

(21) Appl. No.: 10/992,386

(22) Filed: Nov. 18, 2004

(65) Prior Publication Data

US 2005/0115662 A1    Jun. 2, 2005

Related U.S. Application Data

(63) Continuation-in-part of application No. 10/688,013, filed on Oct. 17, 2003, now Pat. No. 7,138,023.

(51) Int. Cl.
*B32B 37/00* (2006.01)

(52) U.S. Cl. ............... 156/148; 156/296; 156/62.6; 156/308.2

(58) Field of Classification Search ........... 156/308.2, 156/296, 62.2, 62.6
See application file for complete search history.

(56) References Cited

U.S. PATENT DOCUMENTS

| | | |
|---|---|---|
| 4,242,398 A | 12/1980 | Segawa et al. |
| 4,379,801 A | 4/1983 | Weaver et al. |
| 4,379,802 A | 4/1983 | Weaver et al. |
| 4,418,031 A | 11/1983 | Doerer et al. |
| 4,568,581 A | 2/1986 | Peoples, Jr. |
| 4,751,134 A | 6/1988 | Chenoweth et al. |
| 4,946,738 A | 8/1990 | Chenoweth et al. |
| 5,055,341 A | 10/1991 | Yamaji et al. |
| 5,205,018 A | 4/1993 | Leifeld et al. |
| 5,272,000 A | 12/1993 | Chenoweth et al. |
| 5,571,610 A | 11/1996 | Loftus et al. |

(Continued)

FOREIGN PATENT DOCUMENTS

EP    000774343    5/1997

(Continued)

*Primary Examiner*—Jeff H. Aftergut
(74) *Attorney, Agent, or Firm*—Inger H. Eckert; Margaret S. Millikin

(57) ABSTRACT

A method of forming a multilayer insulation material formed of an acoustical composite layer and a first thermal layer is provided. The acoustical and insulting layer is formed of a polymer based thermoplastic material and reinforcing fibers. Preferably the reinforcing fibers are wet use chopped strand glass fibers (WUCS). The acoustical composite layer may be formed by opening the WUCS fibers, blending the reinforcement and polymer fibers, forming the reinforcement and polymer fibers into a sheet, and then bonding the sheet. A first thermal layer formed of one or more polymer based thermoplastic organic materials is then positioned on a first major surface of the acoustical composite layer. A second thermal layer of polymeric fibers may be optionally positioned on a second major surface of the acoustical composite layer. The multilayer acoustic material may be utilized in semi-structural and acoustical applications.

22 Claims, 4 Drawing Sheets

U.S. PATENT DOCUMENTS

| | | |
|---|---|---|
| 5,584,950 A | 12/1996 | Gaffigan |
| 5,614,132 A | 3/1997 | Bakhshi et al. |
| 5,662,981 A | 9/1997 | Olinger et al. |
| 5,841,081 A | 11/1998 | Thompson et al. |
| 5,876,529 A | 3/1999 | Grant et al. |
| 6,077,613 A | 6/2000 | Gaffigan |
| 6,572,723 B1 | 6/2003 | Tilton et al. |
| 6,669,265 B2 | 12/2003 | Tilton et al. |
| 6,695,939 B1 | 2/2004 | Nakamura et al. |
| 6,905,563 B2 * | 6/2005 | Dong ........................ 156/62.4 |
| 7,138,023 B2 * | 11/2006 | Haque et al. ................ 156/148 |
| 2003/0003835 A1 | 1/2003 | Tilton et al. |
| 2003/0008592 A1 | 1/2003 | Block et al. |
| 2003/0044566 A1 | 3/2003 | Yang et al. |
| 2003/0124940 A1 | 7/2003 | Michael |
| 2003/0176131 A1 | 9/2003 | Tilton |
| 2004/0065507 A1 | 4/2004 | Jacobsen |
| 2004/0217507 A1 | 11/2004 | Yang et al. |

FOREIGN PATENT DOCUMENTS

| | | |
|---|---|---|
| JP | 408072108 | 3/1996 |
| WO | WO 2005/037897 | 4/2005 |

* cited by examiner

COMPOSITE MATERIAL WITH IMPROVED STRUCTURAL, ACOUSTIC AND THERMAL PROPERTIES

CROSS REFERENCE TO RELATED APPLICATIONS

This application is a continuation-in-part of U.S. patent application Ser. No. 10/688,013 entitled "Development Of Thermoplastic Composites Using Wet Use Chopped Strand Glass In A Dry Laid Process" filed Oct. 17, 2003, now U.S. Pat. No. 7,138,023, the content of which is incorporated by reference in its entirety.

TECHNICAL FIELD AND INDUSTRIAL APPLICABILITY OF THE INVENTION

The present invention relates generally to acoustical products, and more particularly, to a method of forming a thermal and acoustic composite material that includes a first layer of polymer based thermoplastic fibers and glass fibers and a second layer of organic fibers.

BACKGROUND OF THE INVENTION

Sound insulation materials are used in a variety of settings where it is desired to dampen noise from an external source. For example, sound insulation materials have been used in applications such as in appliances to reduce the sound emitted into the surrounding areas of a home, in automobiles to reduce mechanical sounds of the motor and road noise, and in office buildings to attenuate sound generated from the workplace, such as from telephone conversations or from the operation of office equipment. In automobiles, the insulation material also relies upon thermal shielding properties to reduce or prevent the transmission of heat from various heat sources in the automobile (e.g., engine, transmission, exhaust, etc.) to the passenger compartment of the vehicle. Acoustical insulation typically relies upon both sound absorption (i.e., the ability to absorb incident sound waves) and transmission loss (i.e., the ability to reflect incident sound waves) to provide adequate sound attenuation.

Conventional acoustical insulation materials include materials such as foams, compressed fibers, fiberglass batts, felts, and nonwoven webs of fibers such as meltblown fibers. Laminates of one or more layers of insulation and one or more layers of a rigid material are commonly used when a rigid insulative material is desired. Examples of conventional acoustical insulation materials are set forth below.

U.S. Pat. No. 5,662,981 to Olinger et al. describes a molded composite product that has a resinous core layer that contains reinforcement fibers (e.g., glass and polymer fibers) and a resinous surface layer that is substantially free of reinforcement fibers. The surface layer may be formed of thermoplastics or thermoset materials such as poytretrafluoroethylene, polyethylene terephthalate (PET), polyvinyl chloride (PVC), polyphenylene sulfide (PPS), or polycarbonate.

U.S. Pat. No. 5,886,306 to Patel et al. discloses a layered acoustical insulating web that includes a series of cellulose fiber layers sandwiched between a layer of melt-blown or spun-bond thermoplastic fibers (e.g., polypropylene) and a layer of film, foil, paper, or spunbond thermoplastic fibers.

U.S. Pat. No. 6,669,265 to Tilton et al. describes a fibrous material that has a lofty, acoustically insulating portion and a relatively higher density skin that may function as a water barrier. The fibrous material includes polyester, polyethylene, polypropylene, polyethylene terephthalate (PET), glass fibers, natural fibers, and mixtures thereof.

U.S. Pat. No. 6,695,939 to Nakamura et al. discloses an interior trim material that is formed of a substrate and a skin bonded to the substrate. The substrate is a mat-like fiber structure that is a blend of thermoplastic and inorganic fibers. The skin is a high melting point fiber sheet formed from fibers that have a melting point higher than the melting point of the thermoplastic fibers in the substrate. The high melting point fibers may be polyethylene terephthalate (PET) fibers.

U.S. Patent Publication No. 2003/0039793 A1 to Tilton et al. describes a trim panel insulator for a vehicle that includes a nonlaminate acoustical and thermal insulating layer of polymer fibers. The insulator may also include a relatively high density, nonlaminate skin of polymer fibers and/or one or more facing layers formed of polyester, polypropylene, polyethylene, rayon, ethylene vinyl acetate, polyvinyl chloride, fibrous scrim, metallic foil, and mixtures thereof.

U.S. Patent Publication No. 2004/0002274 A1 to Tilton discloses a laminate material that includes (1) a base layer formed of polyester, polypropylene, polyethylene, fiberglass, natural fibers, nylon, rayon, and blends thereof and (2) a facing layer. The base layer has a density of from approximately 0.5-15.0 pcf and the facing layer has a density of between about 10 pcf and about 100 pcf.

U.S. Patent Publication No. 2004/0023586 A1 to Tilton et al. and U.S. patent Publication No. 2003/0008592 to Block et al. disclose a fibrous blanket material that has a first fibrous layer formed of polyester, polypropylene, polyethylene, fiberglass, natural fibers, nylon, and/or rayon and a layer of meltblown polypropylene fibers. A second fibrous layer may be sandwiched between the first fibrous layer and the layer of meltblown fibers. The blanket material may be tuned to provide sound attenuation for a particular product application.

U.S. Patent Publication No. 2004/0077247 to Schmidt et al. describes a nonwoven laminate that contains a first layer formed of thermoplastic spunbond filaments having an average denier less than about 1.8 dpf and a second layer containing thermoplastic multicomponent spunbond filaments having an average denier greater than about 2.3 dpf. The laminate has a structure such that the density of the first layer is greater than the density of the second layer and the thickness of the second layer is greater than the thickness of the first layer.

Although there are numerous acoustical insulation products in existence in the art, none of the existing insulation products provide sufficient structural properties for automotive applications. Thus, there exists a need for acoustical insulation materials that exhibit superior sound attenuating properties, improved structural and thermal properties, and that are lightweight and low in cost.

SUMMARY OF THE INVENTION

It is an object of the present invention to provide a multilayer composite material that may be used in acoustic and semi-structural applications. The multilayer composite material is formed of an acoustical composite layer and a first thermal layer. The fibrous material forming the acoustical composite layer includes polymer based thermoplastic materials such as polyester and polypropylene and reinforcement fibers such as glass fibers. The fibrous material may contain from 40-60% glass fibers. The first thermal layer is positioned on a first major surface of the acoustical composite layer. The fibrous material forming the first thermal layer includes polymer based thermoplastic organic materials such as are present in the acoustical composite layer. In preferred embodiments, the first thermal layer is formed 100% of polymer fibers. However, bicomponent fibers may be included as a component of the fibrous material forming the first thermal layer in amount of from 10-80% of the total fibers. One or more types of polymeric materials may be used to form the first thermal layer. The polymeric materials may have different lengths and diameters. A second thermal layer may optionally be positioned on a second major surface of the acoustical composite layer. The acoustical composite layer and the first and second thermal layers may be non-woven mats of randomly oriented fibers and may be formed by air laid, wet-laid, or meltblown processes.

It is another object of the present invention to provide a method of forming a thermal and acoustic composite material formed of an acoustical composite layer and a first thermal layer. The acoustical composite layer is formed of a mixture of thermoplastic polymer fibers and reinforcement fibers and the thermal layer is formed entirely of thermoplastic polymer fibers. The thermoplastic polymer fibers in the first thermal layer may be the same as or different than the thermoplastic polymer fibers in present in the acoustical composite layer.

In a preferred embodiment, the reinforcement fibers are wet use chopped strand glass fibers. Wet reinforcement fibers are typically agglomerated in the form of a bale, package, or bundle of individual glass fibers. To form the acoustical composite layer, wet reinforcement fibers are opened and at least a portion of the water present in the wet reinforcement fibers is removed. In at least one exemplary embodiment, the bundles of wet reinforcement fibers are fed into a first opener which at least partially opens the bundles and filamentizes the wet reinforcement fibers. The first opener then feeds the opened bundles of wet reinforcement fibers to a condenser to remove water from the wet reinforcement fibers. The reinforcement fibers may then optionally be transferred to a second opener which further filamentizes and separates the reinforcement fibers. The thermoplastic polymer fibers may be opened by passing the polymer fibers through an opener. The openers may be bale openers such as are well-known in the art.

The reinforcement fibers and thermoplastic polymer fibers are then blended, such as by mixing the fibers together in an air stream. The blended mixture of reinforcement fibers and polymer fibers may be then transferred to at least one sheet former where the fibers are formed into a sheet. The sheet may then be subjected to a needling process in which barbed needles are pushed through the fibers of the sheet to entangle the reinforcement fibers and polymer fibers. The sheet may be passed through a thermal bonder to thermally bond the reinforcement fibers and polymer fibers and form the acoustical composite layer. The first thermal layer is then affixed to a first major surface of the acoustical composite layer.

It is yet another object of the present invention to provide a method of forming a fibrous polymer mat. In this process, no reinforcement fibers are used. Bundles of first polymeric fibers and bundles of second polymeric fibers are opened by passing the bundles through first and second openers respectively. The opened first and second polymeric fibers are then blended and transferred to a sheet former, such as by a blower unit. The sheet may be conveyed to a needle processing apparatus for mechanical strengthening. A binder resin may be added prior to passing the sheet through a thermal bonder and/or a mechanical needler. The binder resin may be added by any suitable manner known to those of skill in the art. The resulting fibrous polymer mat may be used as the first thermal layer, as well as mats for dash insulators, under carpets, and in trim panels in automobiles.

It is an advantage of the present invention that cycle time, materials, and labor cost needed to provide desired acoustic properties are reduced. Because of the improved structural and thermal properties of the multilayer composite material, there is no need to add secondary materials to the final acoustic part as is conventionally done to achieve the desired sound attenuation, structural, or insulation capability. The elimination of these secondary materials reduce the amount of materials needed to form interior acoustic and structural panels for automobiles and RVs and eliminates a manufacturing step, thereby increasing overall productivity and decreasing cycle time.

It is another advantage of the present invention that the thermal and acoustic composite material can optimize the properties needed for specific product applications by altering the weight of the fibers in the acoustical and insulating later and thermal layer or by changing the types of the fibers in each of the layers. In addition, the thickness of the formed composite part, the porosity of the formed composite part (e.g., void content), and the air flow path may be controlled by changing the basis weight of the polymer fibers and/or glass content in the acoustical composite material.

It is a further advantage of the present invention that the thermal and acoustic composite material may be molded or die-cut to form a desired acoustical, semi-structural final part in a one step process.

It is yet another advantage of the present invention that when wet use chopped strand glass fibers are used as the reinforcing fiber material, the glass fibers may be easily opened and fiberized with little generation of static electricity due to the moisture present in the glass fibers. In addition, wet use chopped strand glass fibers are less expensive to manufacture than dry chopped fibers because dry fibers are typically dried and packaged in separate steps before being chopped. Therefore, the use of wet use chopped strand glass fibers allows composite products to be manufactured at lower costs.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION AND PREFERRED EMBODIMENTS OF THE INVENTION

Figure 1:
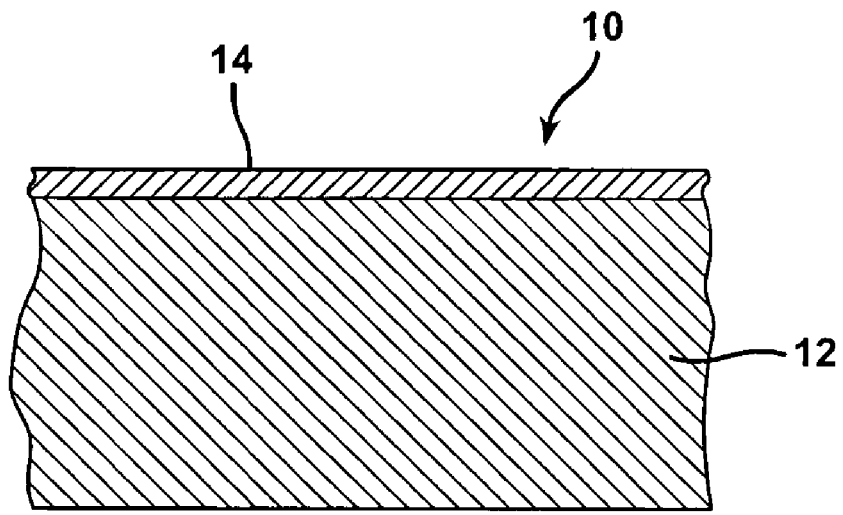
FIG. 1 is a schematic illustration of a composite material formed of an acoustical composite layer and a thermal layer according to at least one exemplary embodiment of the present invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, or any other references, are each incorporated by reference in their entireties, including all data, tables, figures, and text presented in the cited references.

In the drawings, the thickness of the lines, layers, and regions may be exaggerated for clarity. It will be understood that when an element such as a layer, region, substrate, or panel is referred to as being "on" another element, it can be directly on the other element or intervening elements may also be present. The terms "top", "bottom", "side", and the like are used herein for the purpose of explanation only. It is to be noted that like numbers found throughout the figures denote like elements. The terms "sheet", "mat", "veil", and "web" may be used interchangeably herein.

The invention relates to a multilayer acoustic material that is formed of (1) a first composite layer that includes a polymer based thermoplastic material (e.g., polypropylene) and reinforcement fibers (e.g., glass fibers) and (2) a second layer of organic fibers (e.g., polyethylene terephthalate). The multilayer composite material may be utilized in a number of non-structural acoustical applications such as in appliances, in office screens and partitions, in ceiling tiles, in building panels, and in semi-structural applications such as in automobiles (e.g., headliners, hood liners, floor liners, trim panels, parcel shelves, sunshades, instrument panel structures, door inners, and the like), and in wall panels and roof panels of recreational vehicles (RV's).

A multilayer thermal and acoustic composite material 10 formed of an acoustical composite layer 12 and a first thermal layer 14 is illustrated in FIG. 1. It is to be understood that the nomenclature for the acoustical composite layer 12 and the first thermal layer 14 are used for ease of discussion herein and that both the acoustical composite layer 12 and the first thermal layer provide acoustical and thermal insulating properties. In addition, at least the acoustical composite layer 12 provides structural or semi-structural properties to the final acoustical product.

The fibrous material forming the acoustical composite layer 12 includes polymer based thermoplastic materials such as, but not limited to, polyester, polyethylene, polypropylene, polyethylene terephthalate (PET), polyphenylene sulfide (PPS), polyvinyl chloride (PVC), ethylene vinyl acetate/vinyl chloride (EVA/VC) fibers, lower alkyl acrylate polymer fibers, acrylonitrile polymer fibers, partially hydrolyzed polyvinyl acetate fibers, polyvinyl alcohol fibers, polyvinyl pyrrolidone fibers, styrene acrylate fibers, polyolefins, polyamides, polysulfides, polycarbonates, rayon, nylon, and mixtures thereof. Thus, one or more polymers may be present in the acoustical composite layer 12. Preferably, the polymer fibers are from approximately 6-75 mm in length, and are more preferably from 18-50 mm in length. Additionally, the polymer fibers may have a weight per length of from 3-30 denier, and preferably have a weight per length of from 3-7 denier. The thermoplastic polymer fibers may have varying lengths (e.g., aspect ratios) and diameters within the acoustical composite layer 12. The polymer fibers may be present in the acoustical composite layer 12 in an amount of from 40-80% by weight, and are preferably present in an amount of from 40-60% by weight.

The polymer fibers may be functionalized with acidic groups, for example, by carboxylating with an acid such as a maleated acid or an acrylic acid, or the polymer fibers may be functionalized by adding an anhydride group or vinyl acetate. The polymeric thermoplastic material may be in the form of a flake, granule, or a powder rather than in the form of a polymer fiber. A resin in the form of a flake, granule, and/or a powder may be added in addition to the polymer fibers.

In addition, the fibrous material forming the acoustical composite layer 12 includes reinforcing fibers such as, but not limited to, glass fibers, natural fibers, metal fibers, ceramic fibers, mineral fibers, carbon fibers, graphite fibers, or combinations thereof to meet the specific performance requirements of a particular application. Preferably, the reinforcing fiber material is glass fibers. Any type of glass fibers, such as A-type glass fibers, C-type glass fibers, E-type glass fibers, S-type glass fibers, or modifications thereof, may be included as a reinforcing fiber material in the acoustical composite layer 12. The term "natural fiber" as used in conjunction with the present invention refers to plant fibers extracted from any part of a plant, including, but not limited to, the stem, seeds, leaves, roots, or bast. Examples of natural fibers suitable for use as the reinforcing fiber material include cotton, jute, bamboo, ramie, hemp, flax, and combinations thereof.

The fibrous material may contain from 20-60%, and preferably from 40-60%, of the natural, glass, or other reinforcing fibers. The reinforcing fibers may have diameters ranging from approximately 11-25 microns and lengths from approximately 10-100 mm. In preferred embodiments, the reinforcing fibers have diameters of from 12-18 microns and lengths of from 25-50 mm As with the thermoplastic polymer fibers, the reinforcing fibers may have varying lengths and diameters within the acoustical composite layer 12.

The acoustical composite layer 12 may be formed of an air-laid, wet-laid, or meltblown non-woven mat or web of randomly oriented thermoplastic fibers and glass fibers. In at least one exemplary embodiment, the acoustical composite layer 12 is formed by a wet-laid process. For example, chopped glass fibers and thermoplastic fibers, may be dispersed in an aqueous solution that contains a binder as well as dispersants, viscosity modifiers, defoaming agents, and/or other chemical agents and agitated to form a slurry. The thermoplastic and glass fibers located in the slurry may then be deposited onto a moving screen whereby water is removed to form a mat. Optionally, the mat is dried in an oven. The mat may then be immersed into a binder composition where the binder impregnates the mat. The mat is then dried to remove any remaining water and to cure the binder. The resulting non-woven mat (e.g., acoustical composite layer 12) is an assembly of dispersed thermoplastic fibers and glass filaments.

Figure 2:
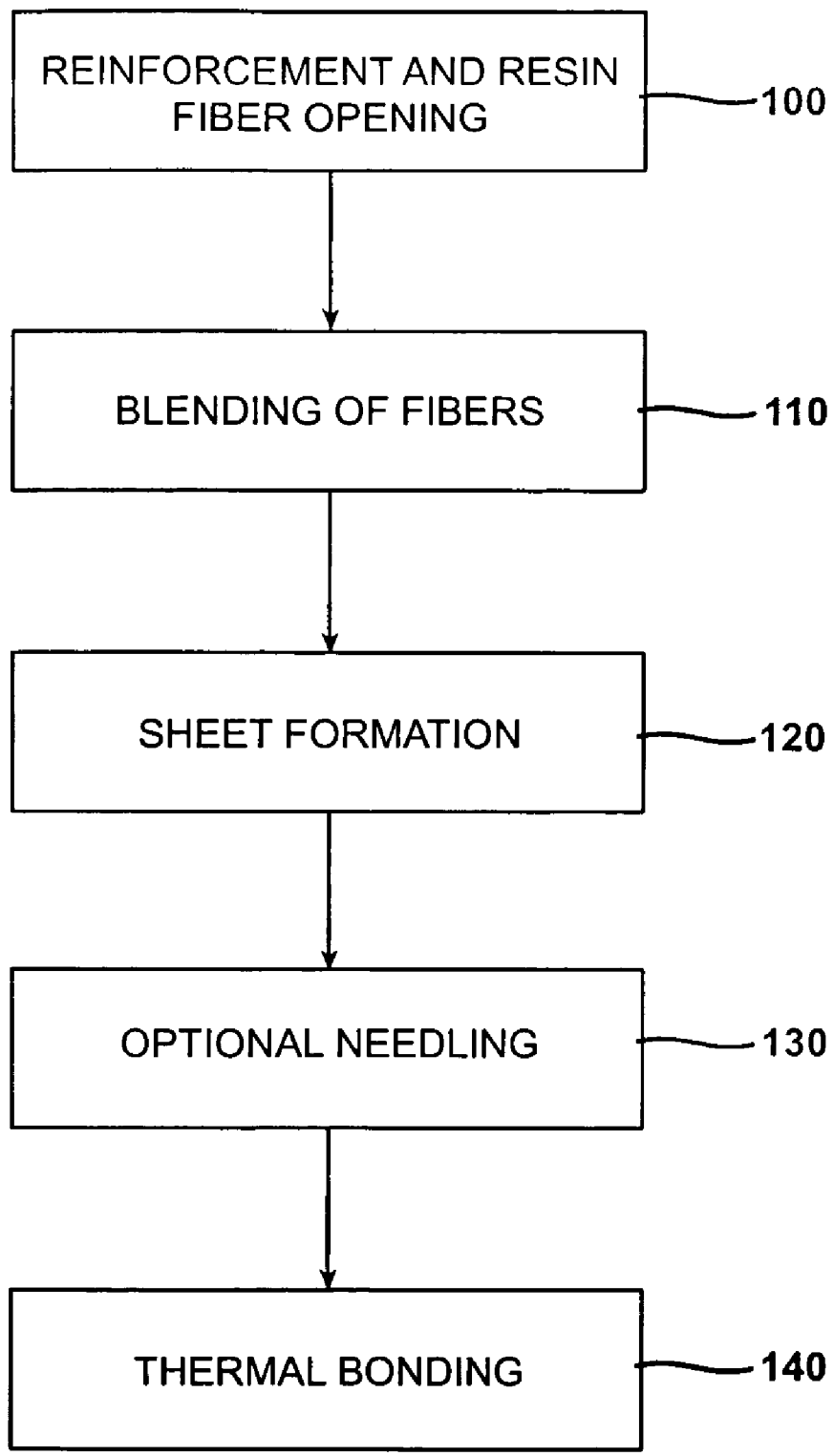
FIG. 2 is a flow diagram illustrating steps for using wet reinforcement fibers in a dry-laid process according to one aspect of the present invention.

Alternatively, the acoustical composite layer 12 may be formed by using wet use chopped strand glass fibers (WUCS) in a dry laid process as described and disclosed in the parent application, U.S. patent application Ser. No. 10/688,013, filed on Oct. 17, 2003 to Enamul Haque entitled "Development Of Thermoplastic Composites Using Wet Use Chopped Strand Glass In A Dry Laid Process." Such a process, as generally illustrated in FIG. 2, includes opening the reinforcement fibers and polymer (resin) fibers (step 100), blending the reinforcement and resin fibers (step 110), forming the reinforcement and resin fibers into a sheet (step 120), optionally needling the sheet to give the sheet structural integrity (step 130), and thermal bonding the sheet (step 140).

Figure 3:
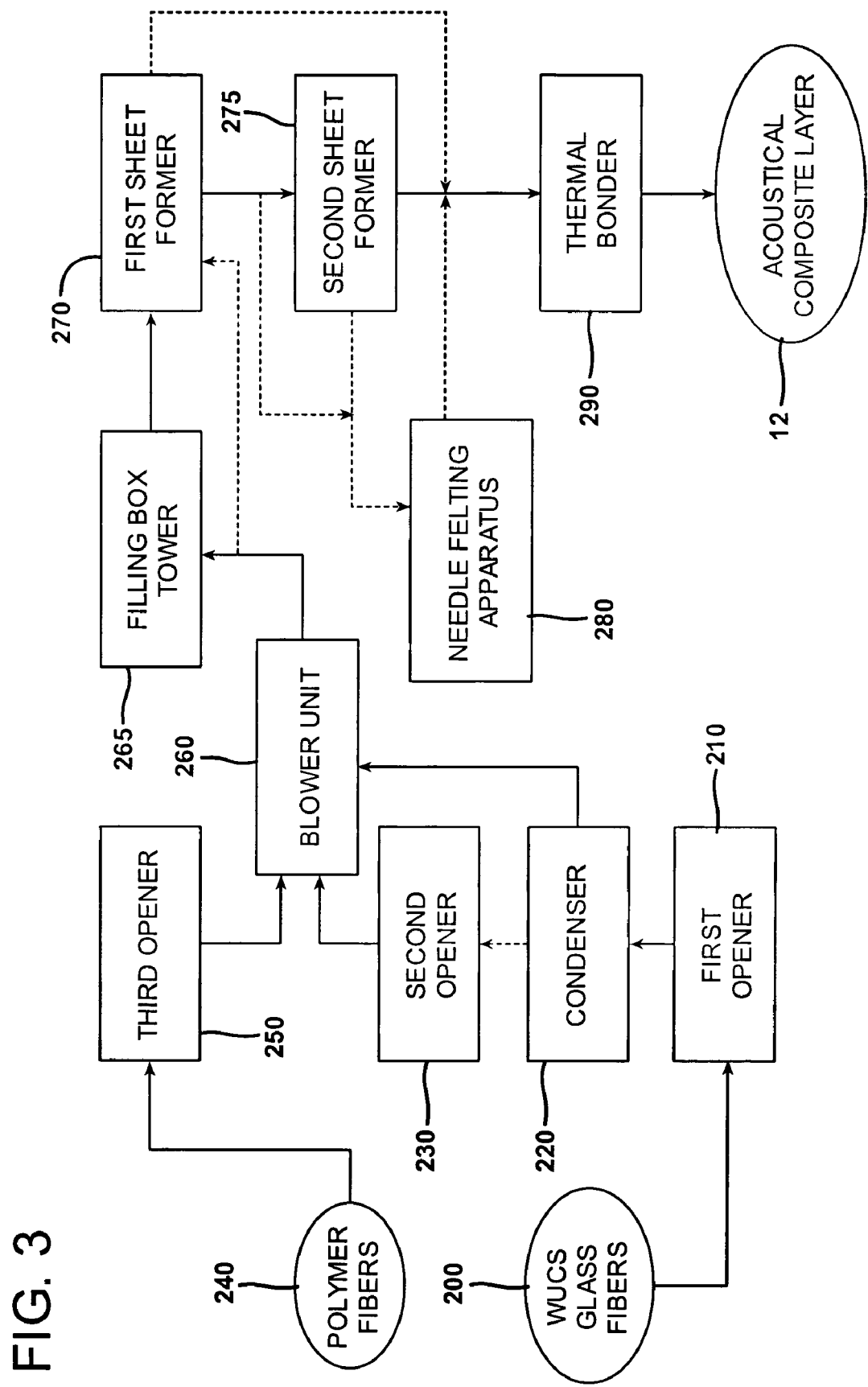
FIG. 3 is a schematic illustration of an air-laid process using wet use chopped strand glass fibers to form an acoustical composite layer according to at least one exemplary embodiment of the present invention.

Turning now to FIG. 3, the opening of the wet reinforcement fibers and the polymer fibers can best be seen. Although FIG. 3 depicts the opening of wet use chopped strand glass fibers (WUCS), a preferred wet reinforcement fiber, any suitable wet reinforcement fiber identified by one of skill in the art could be utilized in the illustrated process. Wet reinforcement fibers, such as are used in the present invention, are typically agglomerated in the form of a bale, package, or a bundle of individual glass fibers. The term "bundle" as used herein is meant to indicate any type of agglomeration of wet reinforcement fibers, which would be easily identified and understood by those of ordinary skill in the art. Wet use chopped strand glass fibers used as the reinforcement fibers can be formed by conventional processes known in the art. Preferably, the wet use chopped strand glass fibers have a moisture content of from 5-30%, and more preferably have a moisture content of from 5-15%.

To open the wet use chopped strand glass fibers, the WUCS glass fibers 200, typically in the form of a bale, package, or bundle of individual glass fibers, are fed into a first opener 210 which at least partially opens and filimentizes (e.g., individualizes) the WUCS glass fibers 200. The first opener 210 may then dose or feed the WUCS glass fibers 200 to a condenser 220 where water is removed from the WUCS glass fibers 200. In exemplary embodiments, greater than 70% of the free water, e.g., water that is external to the glass fibers, is removed. Preferably, however, substantially all of the water is removed by the condenser 220. It should be noted that the phrase "substantially all of the water" as it is used herein is meant to denote that all or nearly all of the free water is removed.

Once the WUCS glass fibers 200 have passed through the condenser 220, the WUCS glass fibers 200 may then be passed through a second opener 230. The second opener 230 further filimentizes and separates the WUCS glass fibers 200.

To open the polymer fibers 240, the polymer fibers 240 may be passed through a third opener 250 where the polymer fibers 240 are opened and filamentized. In alternate embodiments where the resin is in the form of a flake, granule, or powder, the third opener 250 may be replaced with an apparatus suitable for distributing the polymer fibers 240 to the blower unit 260 for mixing with the WUCS glass fibers 200. A suitable apparatus would be easily identified by those of skill in the art. In embodiments where a resin in the form of a flake, granule, or powder is used in addition to the polymer fibers 240, the apparatus distributing the flakes, granules, or powder does not replace the third bale opener 250. Alternatively, a resin powder, flake, or granule may be added prior thermal bonding in the thermal bonder 290 in addition to, or in place of, the polymer fibers 240.

Other types of fibers such as chopped roving, dry use chopped strand glass (DUCS), A-type, C-type, E-type, or S-type glass fibers, natural fibers (e.g., jute, hemp, and kenaf), aramid fibers, metal fibers, ceramic fibers, mineral fibers, carbon fibers, graphite fibers, polymer fibers, or combinations thereof can be opened and filamentized by additional openers (not shown) depending on the desired composition of the acoustical composite layer 12. These fibers can be added to the air stream in the blower unit 260 and mixed with the WUCS glass fibers 200 as described below with respect to the polymer fibers 240. When such fibers are added, it is preferred that from about 10-30% of the fibers in the air stream consist of these additional fibers.

The first, second, and third openers (210, 230, 250) are preferably bale openers, but may be any type of opener suitable for opening the bundle of wet reinforcement fibers. The design of the openers depends on the type and physical characteristics of the fiber being opened. Suitable openers for use in the present invention include any conventional standard type bale openers with or without a weighing device. The bale openers may be equipped with various fine openers and may optionally contain one or more licker-in drums or saw-tooth drums. The bale openers may be equipped with feeding rollers or a combination of a feeding roller and a nose bar. The condenser 220 may be any known drying or water removal device known in the art, such as, but not limited to, an air dryer, an oven, rollers, a suction pump, a heated drum dryer, an infrared heating source, a hot air blower, or a microwave emitting source.

After the WUCS glass fibers 200 and the polymer fibers 240 have been opened and filamentized, they may be transferred to a blower unit 260 where the WUCS glass fibers 200 and polymer fibers 240 are blended together in an air stream (step 110 of FIG. 2). The blended WUCS glass fibers 200 and polymer fibers 240 may then be transferred by the air stream from the blower unit 260 to a first sheet former 270 where the fibers are formed into a sheet (step 120 of FIG. 2). In one exemplary embodiment of the invention, the opened WUCS glass fibers 200 and polymer fibers 240 are transferred from the blower unit 260 to a filling box tower 265 to volumetrically feed the WUCS glass fibers 200 and polymer fibers 240 into the first sheet former 270, such as by an electronic weighing apparatus. The filling box tower 265 may be located in the first sheet former 270 or it may be positioned external to the first sheet former 270. Additionally, the filling box tower 265 may include baffles to further blend and mix the WUCS glass fibers 200 and polymer fibers 240 prior to entering the first sheet former 270.

Alternatively, the blended WUCS glass fibers 200 and polymer fibers 240 are blown onto a drum or series of drums covered with fine wires or teeth to comb the fibers into parallel arrays prior to entering the first sheet former 270 (not shown), as in a carding process.

In at least one exemplary embodiment, the sheet formed by the first sheet former 270 is transferred to a second sheet former 275. The second sheet former 275 permits the sheet to have a substantially uniform distribution of the WUCS glass fibers 200 and polymer fibers 240. In addition, the second sheet former 275 permits the acoustical composite layer 12 to have high structural integrity. In particular, the acoustical composite layer 12 formed may have a weight distribution of from 100-3000 g/m$^2$, with a preferred weight distribution range from about 600 to 2000 g/m$^2$.

The first and second sheet formers 270, 275 may include at least one licker-in drum having two to four sieve drums. Depending on the reinforcement fibers used, the first and second sheet formers 270, 275 may be equipped with one or more of the following: a condenser, a distribution conveyor, a powder strewer, and/or a chip strewer. A sheet former having a condenser and a distribution conveyor is typically used to achieve a higher fiber feed into the filling box tower 265 and an increased volume of air through the filling box tower 265. In order to achieve an improved cross-distribution of the opened fibers, the distributor conveyor can run transversally to the direction of the sheet. As a result, the opened fibers are transferred from the condenser and into the filling box tower 265 with little or no pressure.

The sheet exiting the first sheet former 270 and the second sheet former 275 may optionally be subjected to a needling process in which needles are pushed through the fibers of the sheet to entangle the WUCS glass fibers 200 and polymer fibers 240 (step 130 of FIG. 2). The needling process may occur in a needle felting apparatus 280. The needle felting apparatus 280 may include a web feeding mechanism, a needle beam with a needleboard, barbed felting needles ranging in number from about 500 per meter to about 7,500 per meter of machine width, a stripper plate, a bed plate, and a take-up mechanism. Mechanical interlocking of the WUCS glass fibers 200 and polymer fibers 240 is achieved by passing the barbed felting needles repeatedly into and out of the sheet. An optimal needle selection for use with the particular reinforcement fiber and polymer fiber chosen for use in the inventive process would be easily identified by one of skill in the art.

Either after the sheet forming step 120 (FIG. 2) or the optional needling step 130 (FIG.2), the sheet may be passed through a thermal bonder 290 to thermally bond the WUCS glass fibers 200 and polymer fibers 240. In thermal bonding, the thermoplastic properties of the polymer fibers are used to form bonds with the reinforcement fiber (e.g., WUCS glass fibers 200) upon heating. The thermal bonder 290 may include any known heating and bonding method known in the art, such as oven bonding, oven bonding using forced air, infrared heating, hot calendaring, belt calendaring, ultrasonic bonding, microwave heating, and heated drums. Optionally, two or more of these bonding methods may be used in combination to bond the WUCS glass fibers 200 and polymer fibers 240 in the sheet. The temperature of the thermal bonder 290 may range from approximately 100° C. to approximately 250° C., depending on the melting point of the particular polymer fiber(s) used.

Although the thermoplastic properties of the polymer fibers 240 can be used to bond the WUCS glass fibers 200 and polymer fibers 240, single component binding fibers, bicomponent binding fibers, and/or powdered polymers may be added to the sheet to further bond the WUCS glass fibers 200 and polymer fibers 240. Typical examples of such fibers include polyester fibers, polyethylene fibers, and polypropylene-polyethylene fibers. Such fibers may be added during the initial blending of the WUCS glass fibers 200 and the polymer fibers 240 in the blower unit 260.

Another method that may be used to increase the strength of the sheet after it exits either the first sheet former 270 or the second sheet former 275 is chemical bonding. In chemical bonding, a bonding agent is applied to a sheet or web to bond the reinforcement fibers and resin fibers. Liquid based bonding agents, powdered adhesives, foams, and, in some instances, organic solvents can be used as the chemical bonding agent. If the bonding agent is in powdered or flaked form, it can be added to the sheet prior to the sheet entering the thermal bonder 290. Suitable examples of chemical bonding agents include, but are not limited to, acrylate polymers and copolymers, styrene-butadiene copolymers, vinyl acetate ethylene copolymers, and combinations thereof. For example, polyvinyl acetate (PVA), ethylene vinyl acetate/vinyl chloride (EVA/VC), lower alkyl acrylate polymer, styrene-butadiene rubber, acrylonitrile polymer, polyurethane, epoxy resins, polyvinyl chloride, polyvinylidene chloride, and copolymers of vinylidene chloride with other monomers, partially hydrolyzed polyvinyl acetate, polyvinyl alcohol, polyvinyl pyrrolidone, polyester resins, and styrene acrylate may be used as a bonding agent. The chemical bonding agent can be applied uniformly by impregnating, coating, or spraying the sheet. When the sheet containing the bonding agents is passed through the thermal bonder 290, the bonding agent further bonds the WUCS glass fibers 200 and the polymer fibers 240. Although the temperature requirements for initiating chemical bonding is generally lower than the temperature requirements for thermally bonding the reinforcement fibers and the resin fibers, the chemical bonding process is not as desirable as thermal bonding because it requires the removal of excess bonding agents and further drying of the sheet.

The fibrous material forming the first thermal layer 14 includes polymer based thermoplastic organic materials such as, but not limited to, polyester, polyethylene, polypropylene, polyethylene terephthalate (PET), polyphenylene sulfide (PPS), polyvinyl chloride (PVC), polyolefins, polyamides, polysulfides, polycarbonates, and mixtures thereof. One or more types of polymeric materials may be used to form the first thermal layer 14. The polymer(s) forming the first thermal layer 14 may have the same or different lengths and/or diameters. For example, the first thermal layer 14 may be formed of a single polymeric fibrous material (e.g., PET) in which the polymer fibers have different lengths and/or diameters. As another example, the first thermal layer 14 may be formed of two or more different polymers, and each of the polymers may have the same lengths and diameters, or, alternatively, the polymers may have different lengths and/or diameters. The acoustical behavior of the composite product may be fine tuned by altering the lengths and denier of the polymer fibers. In addition, the ratio of the polymeric fibrous materials present in the first thermal layer 14 can be varied to achieve specific acoustic properties. The polymer fibers in the first thermal layer 14 may be from approximately 2-30 deniers in diameter, preferably between 3-7 deniers, and may have a length of from 6-75 mm, preferably from 18-50 mm. In preferred embodiments, the length of the polymer fibers in the first thermal layer 14 is the substantially the same length as the reinforcement fibers present in the acoustical composite layer 12.

Additionally, the fibrous material of the first thermal layer 14 may include heat fusible fibers such as bicomponent fibers. Bicomponent fibers include two polymers combined to form fibers that have a core of one polymer and a surrounding sheath of the other polymer. When bicomponent fibers are used as a component of the first thermal layer 12, the bicomponent fibers may be present in an amount of from 10-80% of the total fibers.

The first thermal layer 14 is a non-woven mat that may be formed by an air-laid, wet-laid, or meltblown process, and is desirably formed of 100% polymer based thermoplastic materials such as described above. Preferably, the first thermal layer 14 is formed by an air-laid process. For example, an air-laid mat of thermoplastic fibers may be made by melting a polymeric material within a melter or die and extruding the molten polymeric material through a plurality of orifices to form continuous filaments. As the polymer filaments exit the orifices, they are introduced directly into a high velocity air stream which attenuates the filaments and forms discrete, individual polymeric fibers.

The polymeric fibers may then be cooled and collected on a moving air permeable conveyor or screen to form the first thermal layer 14.

Figure 4:
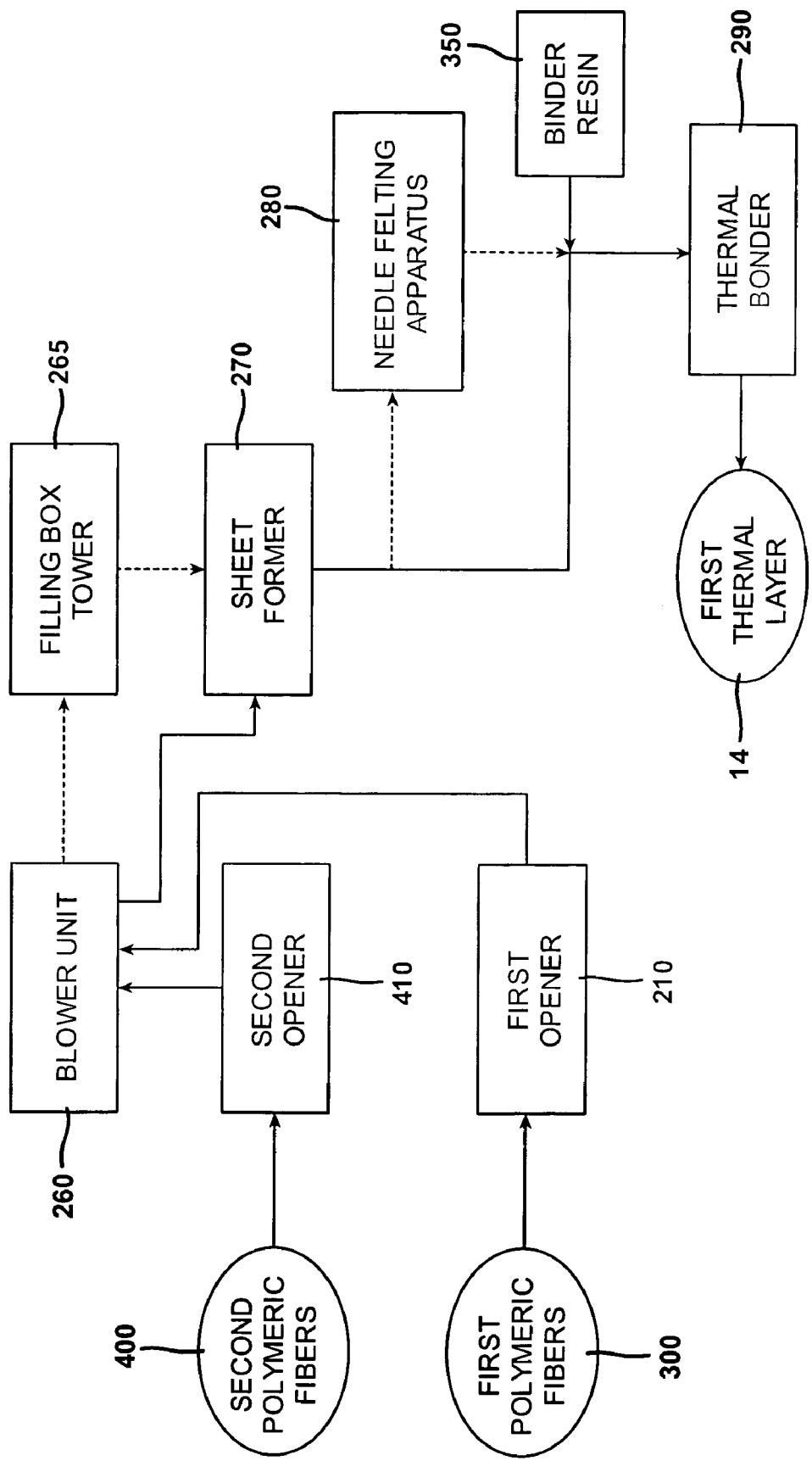
FIG. 4 is a schematic illustration of an air-laid process using two types of polymer fibers to form the first thermal layer according to at least one exemplary embodiment of the present invention.

One exemplary embodiment of the formation of the first thermal layer 14 using two polymer fibers in a dry-laid process is shown in FIG. 4. It is to be appreciated that additional polymeric fibers may be used to form the first thermal layer 14 and that the depiction of two polymer fibers in FIG. 4 is for illustration only. First polymeric fibers 300 and second polymeric fibers 400 may be opened by passing the first polymeric fibers 300 and the second polymeric fibers 400, typically in the form of a bale, package, or a bundle of individual fibers, through a first opener 210 and a second opener 410 respectively. The first polymeric fibers 300 and second polymeric fibers 400 may be the same or different, and may have different lengths and/or diameters from each other as described above. The polymeric fibers 300, 400 are then conveyed by a blower unit 260 to a first sheet former 270. Alternatively, the first and second polymeric fibers 300, 400 may be conveyed to a filling box tower 265 to volumetrically fed the first and second polymeric fibers 300, 400 to the first sheet former 270. The sheet exiting the sheet former 270 may then optionally be conveyed to a second sheet former (not shown) and/or a needle felting apparatus 280 (not shown) for mechanical strengthening.

A binder resin 350 may be added prior to passing the sheet through the thermal bonder 290. The binder resin 350 may be added by any suitable manner, such as, for example, a flood and extract method or by spraying the binder resin 350 on the sheet. Any binder resin capable of binding the polymeric fibers 300, 400 may be used. Suitable examples include single and bicomponent fibers or powders. Further, the amount of binder added may be varied depending of the type of mat desired. The sheet is then passed through a thermal bonder 290 to cure the binder resin 350 and provide structural integrity to polymeric fibers 300, 400. Alternatively, a catalyst such as ammonium chloride, p-toluene, sulfonic acid, aluminum sulfate, ammonium phosphate, or zinc nitrate may be used to improve the rate of curing and the quality of the cured binder resin.

The first thermal layer 14 is positioned on a major surface of the acoustical composite layer 12, and may be attached to the acoustical composite layer 12 such as by a nip-roll system or by using a laminator. In addition, resin tie layers such as Plexar™ (commercially available from Quantum Chemical), Admer™ (commercially available from Mitsui Petrochemical), and Bynel™ (an anhydride modified polyolefin commercially available from DuPont), spray-on adhesives, pressure sensitive adhesives, ultrasonics, vibration welding, or other commonly used fixation technologies may be used to hold the two thermoplastic layers together. It is preferred that the first thermal layer 14 is attached to the acoustical composite layer 12 in-line to improve manufacturing efficiency.

Figure 5:
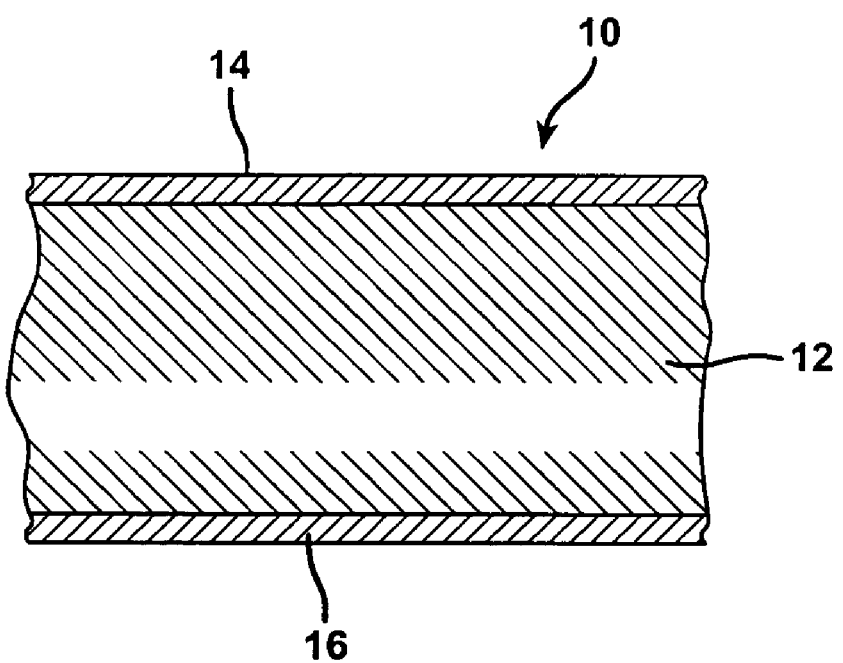
FIG. 5 is a schematic illustration of a composite material including a thermal layer on a first and second surface of an acoustical composite layer according to at least one exemplary embodiment of the present invention.

Optionally, a second thermal layer 16 may be positioned on a second major surface of the acoustical composite layer 12 as shown in FIG. 5. The second thermal layer 16 is formed of 100% thermoplastic organic polymers such as described above with respect to the first thermal layer 14, and may be the same as, or different than, the first thermal layer 14. Non-limiting examples of the polymer based thermoplastic, organic materials used to form the second thermal layer 16 include polyester, polyethylene, polypropylene, polyethylene terephthalate (PET), polyphenylene sulfide (PPS), polyvinyl chloride (PVC), polyolefins, polyamides, polysulfides, polycarbonates, and combinations thereof. The second thermal layer 16 may be bonded to the acoustic and insulating layer 12 by a nip-roll system, by a laminator, or by resin tie layers such as described above.

In addition, the acoustical composite material 10 may also include a facing layer (not shown) on one or both thermal layers 14,16. The facing layer may be in the form of a film such as a copolymer of ethylene-vinyl acetate (EVA) or it may be a textile fabric formed of a synthetic polymer such as, but not limited to, polyethylene terephthalate (PET) or nylon. In addition, the facing layer may be vinyl, leather, or paper-based. The facing layer may assist in altering the acoustical properties of the acoustical composite material 10 so that it can be tuned to meet the needs of a particular application. In addition, depending on the material of the facing layer, the facing layer may improve physical properties of the acoustical composite material 10 such as, but not limited to, water permeability or non-permeability, abrasion resistance, and/or heat resistance.

The process of manufacturing the acoustical composite layer 12, the first thermal layer 14, and the optional second thermal layer 16 may be conducted either in-line, i.e., in a continuous manner, or in individual steps. Preferably, the process is conducted in-line. Moreover, any additional process steps such as adding specialty films, scrims, and/or fabrics are considered within the scope of the invention.

The acoustical composite material 10 may be heated in a forced-air, convection, or infra-red oven to cause the acoustical composite layer 12 and the first thermal layer 14 to loft or expand. The lofted thermal and acoustic composite material 10 may then be molded (e.g., thermo-formed or thermo-stamped) or die-cut with or without a surface material to form a desired acoustical, semi-structural final part, such as, for example, headliners, hood liners, floor liners, trim panels, parcel shelves, sunshades, instrument panel structures, door inners, or wall panels or roof panels of recreational vehicles in a one step process.

The thermal and acoustic composite material 10 of the present invention reduces the cycle time, materials, and labor cost needed to provide desired acoustic properties. For example, when automotive interior panels or load floors are conventionally manufactured, additional layers of materials such as cotton shoddy or polymeric fiber based mats are added to the panels to reduce the noise in the passenger compartment. Because of the high acoustical performance of the composite material 10, there is no need to add a secondary material to the final acoustic part (e.g., interior trim panels or headliners) to achieve the desired sound attenuation. In addition, in conventional structural applications, such as interior side walls of recreational vehicles, foam is added behind the side panel to increase insulation capability. Because of the improved structural and thermal properties of the composite material 10, the use of such foams is unnecessary. The elimination of these secondary materials reduces the amount of materials needed to form such interior acoustic and structural panels for automobiles and RVs and eliminates a manufacturing step (i.e., installing the secondary materials), thereby increasing overall productivity and decreasing cycle time.

In addition, the thermal and acoustic composite material 10 provides the ability to optimize the properties needed for specific applications by altering the weight of the fibers in the different layers, by changing the glass content and/or length or diameter of the glass, by altering the polymeric fiber length or denier, or by changing the formulations of the fibers in each of the layers during the manufacturing of the product. The thickness of the formed composite part, porosity of the formed composite part (e.g., void content), and the air flow path may be controlled by changing the basis weight of the polymer fibers and/or glass content of the thermal and acoustic composite material 10. For example, increasing the weight and glass content of the thermal and acoustic composite material 10 may increase the thickness of the final acoustical part, which, in turn, may increase the porosity of the final product. In addition, the direction of the glass fibers in the acoustical composite layer 12 may be directionally positioned in an air-laid process to change the air flow path and achieve desired acoustical properties or to tune the composite material 10 to meet the needs of a particular application. Typically, glass fibers are laid in an X-Y direction. However, adding a z-directionality to the layers 12, 14 increase the resistance to flow and improves sound absorption properties.

The composite material 10 forms a final product that demonstrates improved structural and thermal properties. Although not wishing to be bound by theory, the improved structural properties (e.g., flexural and tensile properties) of the final part are believed to be attributed to the various combinations of polymeric fibers and glass fibers of different physical properties (e.g., lengths and diameters) in the acoustical composite layer 12. It is also believed that the improved thermal properties of the final part may be attributed polymeric fibers in the thermal layer 14. The thermal layer 14 provides improved end use temperature capability (e.g., heat deflection temperature) and acoustical properties.

It is an advantage of the present invention that when wet use chopped strand glass fibers are used as the reinforcing fiber material, the glass fibers may be easily opened and fiberized with little generation of static electricity due to the moisture present in the glass fibers. In addition, wet use chopped strand glass fibers are less expensive to manufacture than dry chopped fibers because dry fibers are typically dried and packaged in separate steps before being chopped. Therefore, the use of wet use chopped strand glass fibers allows the composite product to be manufactured with lower costs.

It is a further advantage of the present invention that the thermal and acoustic composite material may be molded (e.g., thermo-formed or thermo-stamped) or die-cut to form a desired acoustical, semi-structural final part in a one step process.

It is another advantage of the present invention that the thermal and acoustic composite material optimizes the properties needed for specific applications by altering the weight of the fibers in the different layers or by changing the formulations of the fibers in each of the layers during the manufacturing of the product. The thickness of the formed composite part, porosity of the formed composite part (e.g., void content), and the air flow path may be controlled by changing the basis weight of the polymer fibers and/or glass content of the acoustical composite material.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A method of forming a thermal and acoustic composite material comprising the steps of:
   at least partially opening a bundle of wet reinforcement fibers;
   removing at least a portion of water present in said wet reinforcement fibers to form dehydrated reinforcement fibers;
   blending first thermoplastic polymeric fibers with said dehydrated reinforcement fibers to form an acoustical composite layer; and
   affixing a first thermal layer of second thermoplastic polymeric fibers to a first major surface of said acoustical composite layer, said second thermoplastic polymeric fibers being the same as or different than said first thermoplastic polymeric fibers.

2. The method according to claim 1, further comprising the step of:
   thermal bonding said first thermoplastic polymeric fibers and said dehydrated reinforcement fibers after said blending step.

3. The method according to claim 2, wherein said blending step comprises:
   mixing said first thermoplastic polymeric fibers and said dehydrated reinforcement fibers to form a mixture of said first thermoplastic polymeric fibers and said dehydrated reinforcement fibers; and
   forming said mixture into a sheet.

4. The method according to claim 3, wherein the step of forming said sheet comprises:
   passing said mixture through at least one sheet former.

5. The method according to claim 3, further comprising the step of:
   transferring the mixture to a filling box tower prior to forming said sheet.

6. The method according to claim 3, further comprising the step of:
   needling said sheet prior to said thermal bonding step to provide structural integrity to said acoustical composite layer.

7. The method according to claim 1, wherein said wet reinforcement fibers are wet use chopped strand glass fibers and said first and second thermoplastic polymeric fibers include at least one member selected from the group consisting of polyester, polyethylene, polypropylene, polyethylene terephthalatc, polyphenylene sulfide, polyvinyl chloride, ethylene vinyl acetate/vinyl chioride fibers, lower alkyl acrylate polymer fiber, acrylonitrile polymer fibers, partially hydrolyzed polyvinyl acetate fibers, polyvinyl alcohol fibers, polyvinyl pyrrolidone fibers, styrene acrylate fibers, polyolefins, polyamides, polysulfides, polycarbonates, rayon and nylon.

8. The method according to claim 7, wherein said first thermal layer further includes bicomponent fibers.

9. The method according to claim 7, wherein said first thermoplastic polymeric fibers have varying diameters or varying lengths.

10. The method according to claim 7, wherein said first thermoplastic polymeric fibers have varying lengths and diameters.

11. The method according to claim 1, further comprising the step of:
    at least partially opening said first thermoplastic polymer fibers prior to blending said first thermoplastic polymeric fibers with said dehydrated reinforcement fibers.

12. The method according to claim 1, further comprising the step of:
    attaching a second thermal layer to a second major surface of said acoustical composite layer, said second major surface opposing said first major surface.

13. The method according to claim 12, wherein said second thermal layer includes one or more polymeric materials selected from the group consisting of polyester, polyethylene, polypropylene, polyethylene terephthalate, polyphenylene sulfide, polyvinyl chloride, polyolefins, polyamides, polysulfides and polycarbonates.

14. The method according to claim 9, wherein said polymeric materials forming said second thermal layer have varying lengths or varying diameters.

15. The method according to claim 9, wherein said polymeric materials forming said second thermal layer have varying lengths and diameters.

16. The method according to claim 1, further comprising the step of:
    affixing a facing layer to an exposed surface of said first thermal layer.

17. A method of forming a molded semi-structural acoustical composite product comprising the steps of:
    at least partially opening a bundle of wet reinforcement fibers;
    removing at least a portion of water from said wet reinforcement fibers to form dehydrated reinforcement fibers;
    blending first polymeric fibers with said dehydrated reinforcement fibers;
    forming said blended first polymeric fibers and said dehydrated reinforcement fibers into a sheet;
    bonding said first polymeric fibers and said dehydrated reinforcement fibers in said sheet to form an acoustical composite layer;
    attaching a first thermal layer of second thermoplastic polymeric fibers to a first major surface of said acoustical composite layer to form a composite material; and
    molding said composite material to form a semi-structural acoustical composite product having a desired shape.

18. The method of claim 17, further comprising the step of:
    attaching a second thermal layer to a second major surface of said acoustical composite layer opposing said first major surface, said second thermal layer being formed of third thermoplastic fibers.

19. The method of claim 18, wherein said third thermoplastic fibers include one or more polymeric materials selected from the group consisting of polyester, polyethylene, polypropylene, polyethylene terephthalate, polyphenylene sulfide, polyvinyl chloride, polyolefins, polyamides, polysulfides and polycarbonates.

20. The method of claim 17, wherein said wet reinforcement fibers are wet use chopped strand glass fibers and said first and second thermoplastic polymeric fibers include at least one member selected from the group consisting of polyester, polyethylene, polypropylene, polyethylene terephthalate, polyphenylene sulfide, polyvinyl chloride, ethylene vinyl acetate/vinyl chloride fibers, lower alkyl acrylate polymer fibers, acrylonitrile polymer fibers, partially hydrolyzed polyvinyl acetate fibers, polyvinyl alcohol fibers, polyvinyl pyrrolidone fibers, styrene acrylate fibers, polyolefins, polyamides, polysulfides, polycarbonates, rayon and nylon.

21. The method of claim 17, wherein the step of forming said blended first polymeric fibers and said dehydrated reinforcement fibers into a sheet comprises the step of:
    passing said mixture through at least one sheet former.

22. The method according to claim 17, further comprising the step of:
    transferring said mixture to a filling box tower prior to forming said sheet.

* * * * *